Oct. 5, 1965 H. H. J. M. GRADUS 3,210,622

PHOTO-TRANSISTOR

Filed Sept. 6, 1960

INVENTOR

Henri H. J. M. Gradus.

BY

Frank R. Trifari

AGENT

United States Patent Office 3,210,622

Patented Oct. 5, 1965

3,210,622

PHOTO-TRANSISTOR

Henri Herman Jean Marie Gradus, Eindhoven, Netherlands, assignor to North American Philips Company, Inc., New York, N.Y., a corporation of Delaware Filed Sept. 6, 1960, Ser. No. 54,237
Claims priority, application Netherlands, Sept. 11, 1959, 243,273
4 Claims. (Cl. 317—235)

Figure 1A:
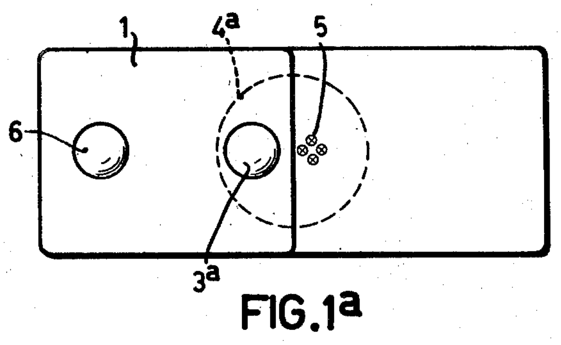

The invention relates to a photo-transistor having a semi-conductor body in the shape of a thin plate of which one side is partly covered by an emitter electrode and the other, opposite side by a collector electrode, which electrodes establish rectifying connections with the intermediate base zone. In connection with certain uses a third electrode may be provided on the semi-conductor body, i.e., a base contact which establishes an ohmic connection to the base zone. With a photo-transistor the semi-conductor body with its electrodes is furthermore housed in an envelope so that the radiation can be incident to a sensitive spot of the semi-conductor body, for example, via a suitably arranged part of the envelope, which allows the radiation to pass and which may be combined or not combined with an optical system.

With a photo-transistor of the kind set forth the emitter electrode and the collector electrode are usually provided on the semi-conductor body diametrically opposite each other in the form of alloy electrodes, the surface of the collector electrode being usually larger than that of the emitter electrode. With this known embodiment the radiation is preferably caused to strike the emitter side of the semi-conductor body near the emitter electrode. This known structure of the semi-conductor body with its electrodes is largely employed not only in photo-transistors but also in normal transistors related thereto in their operation as amplifying elements, since this transistor can be manufactured in a simple manner by methods known in the semi-conductor technique, for example, by alloying and/or diffusing.

It has now been found that this known structure, which is particularly suitable for a transistor amplifying element, has less favourable properties for a photo-transistor in certain respects, i.e., with a view to the response time and the frequency region. It appeared, more particularly, that the limit frequency of this structure of a photo-transistor is considerably lower than the limit frequency of this structure, having otherwise the same dimensions and used for a transistor current amplifier. The term "response time" is to be understood to mean the time elapsing between the instant when the radiation is incident and the instant when the corresponding electric signal is produced in the photo-transistor. The limit frequency of a photo-transistor is to be understood to mean, as usual, the maximum frequency of the amplitude-frequency characteristic curve of the photo-transistor, of which the corresponding amplitude value is equal to $1/\sqrt{2}$ times the maximum amplitude of the characteristic curve. This amplitude-frequency characteristic curve may be determined by causing a radiation signal of variable intensity to strike a photo-transistor included in a conventional arrangement, in which between the emitter electrode and the collector electrode a constant voltage difference is applied, which drives the emitter electrode in the forward direction and the collector electrode in the blocking direction, so that at a constant amplitude of the radiation intensity variation the amplitude of the current intensity resulting in the emitter-electrode-collector-electrode circuit is determined as a function of the frequency of the radiation intensity variation. For many uses of photo-transistors, for example, those in which the photo-transistor is used in conjunction with a relay as a light-sensitive switch, or those in which the photo-transistor is used for converting a radiation signal varying with time in intensity in accordance with a given information into a correspondng variation of an electric magnitude, for example, the current intensity passing through the photo-transistor, a rapid response and operation at higher frequencies are desirable.

The invention has for its object inter alia to provide a photo-transistor which can be manufactured by simple methods known in the semi-conductor technique, to which transistor are inherent a more favourable short response time and higher frequency operation.

With a photo-transistor having a semi-conductor body in the shape of a thin plate or wafer, of which one side is partly covered by an emitter electrode and the other, opposite side by a collector electrode, which electrodes establish rectifying connections to the intermediate base zone, the semi-conductor plate has, in accordance with the invention, a depressed part which is located within a distance from the collector electrode which is smaller than the minimum distance between the emitter and the collector, while the radiation is mainly incident to this depressed part of the semi-conductor body.

Since with the photo-transistor according to the invention the distance of the place where the radiation releases in the semi-conductor body hole-electron pairs from the collector electrode is smaller, owing to the provision of a depressed part, than with the known photo-transistor of the type described above, in which the said distance, owing to the diametrical positions of the emitter electrode and the collector electrode, is practically always larger than the electrode spacing, the diffusion time of the minority charge carriers from this place to the collector electrode is reduced and hence the response time diminished and the frequency response raised. The operation of a photo-transistor is based on the fact that the minority carriers of the excited hole-electron pairs in the base zone travel to the collector electrode and at the instant of the transition from the base zone into the collector electrode give rise to an enhanced concentration of majority carriers, i.e., those of the majority carriers left in the base zone. This enhanced concentration may be considered to have been introduced from an imaginary base contact into the base zone and as with a conventional transistor in common emitter connection this concentration will give rise to an intensified after-supply of minority carriers from the emitter electrode and hence to an increased collector current. The frequency behaviour of a photo-transistor is therefore determined not only by the frequency behaviour of its structure as a conventional transistor amplifier but also by the required time for the diffusion of minority carriers from the spot of excitation to the collector electrode, which diffusion precedes the transistor effect. With a photo-transistor according to the invention this distance is therefore chosen to be small, particularly even smaller than half of the electrode spacing. To this end the depressed part of the base zone is preferably provided within a distance from the collector electrode which is smaller than half the electrode spacing. The smaller the said distance, the shorter the response time and the higher the operating frequency. The depressed part is preferably provided in the base zone within a distance of about the magnitude of one absorption length from the collector electrode, so that the radiation is capable of penetrating to near or even into the collector electrode blocking layer, the disadvantageous delay effect being thus substantially completely obviated and the frequency characteristic curve of the photo-transistor according to the invention approaching the frequency characteristic curve of the same structure as a transistor current amplifier. An absorption length, which depends inter alia upon the semiconductor employed and upon the wavelength of the radiation concerned, is to be understood to mean herein the distance over which the intensity of the radiation concerned is reduced by a factor *e*, when striking the semi-conductor concerned, owing to absorption; *e* designates the Neper number which is approximately equal to 2.718. For germanium and silicon the absorption length for visible light is a few microns.

The invention thus provides a possibility of improving considerably the frequency region and the response time with a given electrode distance between the emitter electrode and the collector electrode, which distance is usually chosen to be not smaller than a given value, for technical reasons or which cannot be smaller than the said value. A further additional advantage consists in that owing to the reduction of the distance between the excitation area and the collector electrode also the photosensitivity is materially improved.

The invention will now be described more fully with reference to one embodiment and two figures.

Figure 1B:
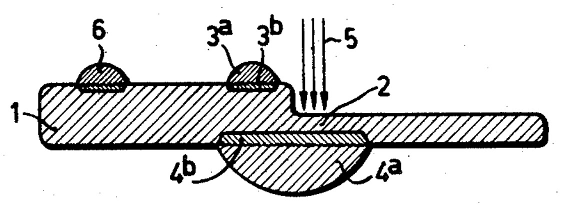

The FIGS. 1*a* and 1*b* show diagrammatically, in a plan view and a sectional view respectively, one embodiment of a photo-transistor according to the invention.

Figure 2:
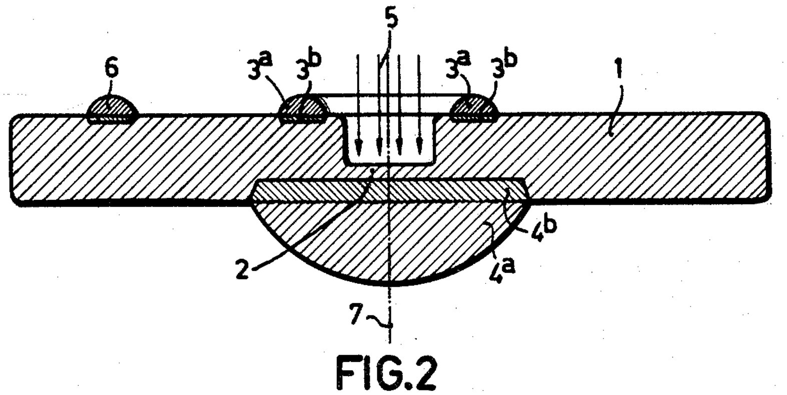

FIG. 2 shows diagrammatically, in a sectional view, a further, particularly suitable embodiment of the photo-transistor according to the invention.

With the photo-transistor shown in FIGS. 1*a* and 1*b* the top side of the rectangular semi-conductor plate 1 is provided, at the side of the emitter electrode consisting of the metal contact part 3*a* and the semi-conductor part 3*b* associated with the electrode of, for example, p-type germanium, with the depressed part 2 of the base zone. The collector electrode consisting of the metal contact part 4*a* and the semi-conductor part 4*b* associated with the electrode, for example, of p-type germanium is provided on the opposite side of the semi-conductor plate, for example, of n-type germanium. It is evident from the figure that the right-hand part of the semi-conductor plate is, throughout its surface, thinner than the left-hand part so that, in accordance with the invention, a depressed part 2 is obtained, which is located within a distance smaller than the distance between the emitter electrode and the collector electrode from the collector electrode (4*a*, 4*b*), particularly even within a distance less than half the said electrode spacing. To this depressed part 2 is incident the radiation, indicated in FIGS. 1*a* and 1*b* by arrows 5 on the semi-conductor body. According to a further aspect of the invention it is advantageous for the collector electrode (4*a*, 4*b*) to occupy on the opposite side an uninterrupted surface of a size at least such that this electrode embraces the perpendicular projection of the emitter electrode (3*a*, 3*b*) and of the depressed part 2, at least as far as it effectively receives the radiation, onto the collector side of the body. This embodiment is also shown in FIG. 1*a*, where the circumference of the collector electrode is indicated by the broken line 4*a*. On the semi-conductor body is furthermore provided a base contact 6, which, however, is superfluous for certain transistor uses and may be dispensed with or, if it is provided, not be used. It should furthermore be noted that in the embodiment in FIG. 1 the right-hand part of the semi-conductor plate is thinner throughout its surface, but, as a matter of fact, the effect of the invention is also achieved in a photo-transistor in which the depression is provided in the form of a cavity only locally opposite the collector electrode in the semi-conductor body.

FIG. 2 show a particularly suitable embodiment of a photo-transistor according to the invention. The emitter electrode thereof is shaped in the form of a ring, inside which the depression 2 of the semi-conductor body is provided. The radiation beam 5 is again mainly incident to the depression 2. Also in this embodiment the collector electrode (4*a*, 4*b*) is chosen so large that it embraces the projection of the emitter electrode (3*a*, 3*b*) and of the depression onto the collector side of the body 1. The assembly is substantially symmetrical to the axis of symmetry 7 with the exception of the ohmic base contact 6, which is fused only locally in the form of a hemisphere onto the semi-conductor body. The depression 2 is located preferably within a distance from the collector electrode which is approximately of the order of the absorption length for the radiation concerned in the semi-conductor concerned. Owing to the annular shape of the emitter electrode and the central position of the depression a particularly effective photo-transistor structure is obtained, which exhibits a rapid response, high frequency operation and a high sensitivity. In order to cause the radiation to strike mainly the depression 2, the top side of the plate 1 may, if necessary, be covered with an insulating lacquer impervious to the radiation with the exception of the depression 2.

The photo-transistors according to the invention may be manufactured by simple, known methods, for example, alloying, diffusion, etching and/or lapping. The manufacture of the embodiment shown in FIG. 2 may, for example, be carried out as follows. To a thin n-type germanium disc, having a resistivity of about 1 ohm-cm. are applied, in known manner, opposite each other, an annular emitter electrode of indium and a collector electrode of indium by alloying, so that the distance between the electrodes is about 50$\mu$. Then a base contact 6 is provided by alloying a pellet of lead-antimony (2% of Sb). To the metal parts of the electrodes are soldered supply wires and the assembly is then covered by a masking layer, with the exception of the body surface located inside the ring. The electrode system is subsequently dipped into an etching fluid, for example, consisting of a 40% KOH solution, a positive voltage relative to an electrode provided in the etching bath being applied to the base contact. The place of etching may be furthermore determined accurately by directing, during the etching operation, a radiation beam to the semi-conductor body at the desired place. Thus the material of the semi-conductive body is selectively etched away and a depressed part 2 is obtained as is shown in FIG. 2. The penetration depth may be controlled during the etching operation in known manner by utilizing the depletion layer of the collector-electrode -p-n- junction. When during etching, in addition, a blocking voltage is applied between the collector electrode and the base contact, a depletion layer expands from the p-n junction in the base zone over a distance which depends upon the value of the blocking voltage applied. As soon as the etching effect reaches the said depletion layer, the current intensity in the collector-base circuit increases strongly. By applying, during etching, such a blocking voltage between the base contact and the collector electrode that the depletion layer in the base zone extends down to the desired penetration depth, a simple control of the current passing through the collector-base circuit suffices to determine the instant when etching has attained the desired penetration depth. Thus a photo-transistor was manufactured, in which the depressed part was spaced apart from the collector electrode by a distance of about 5$\mu$. From measurements it appeared that the limit frequency of this photo-transistor amounted to about 14 kc./s., whereas the limit frequency of a similar structure without a depressed part but with otherwise substantially the same dimensions was only about 7 kc./s.

Finally it should be noted that the invention is, as a matter of course, not restricted to the semiconductor germanium mentioned above by way of example, but that other semi-conductors, such as silicon and the $A_{III}B_V$ compounds, for example GaAs, SnP may be employed. Also with respect to the manufacture there are many modifications. Use may, for example, be made of the diffusion technique for the provision of the base zone in the semi-conductor body. The depression may, for example, also be obtained by lapping. The embodiment shown in FIG. 2 may be obtained, as an alternative by starting from a coherent, alloyed emitter electrode, in which a cavity is provided by boring down to the desired distance from the collector electrode, after which, if necessary, by slightly etching subsequently, the damaged monocrystalline semi-conductor material may be removed.

What is claimed is:

1. A radiation actuable phototransistor comprising a thin wafer of semiconductive material of one type conductivity having opposed major surfaces, a first surface region on one major surface of the opposite type conductivity forming a first rectifying junction with an interior region of said wafer of said one type conductivity, said first junction extending substantially parallel to the one major surface and having a given cross-sectional area in a plane parallel to said one major surface, a second surface region on the opposite major surface also of the opposite type conductivity forming a second rectifying junction with an interior region of said wafer, said semiconductive wafer having adjacent the first rectifying junction a recessed portion extending from the said one major surface past the first rectifying junction and into the wafer interior of said one type conductivity close to but spaced from the second rectifying junction, said spacing to the second rectifying junction being less than one-half the closest spacing between the first and second rectifying junctions, the second rectifying junction extending substantially parallel to said first rectifying junction and having a cross-sectional area in a plane parallel to said one major surface that is substantially greater than said given cross-sectional area, said second rectifying junction underlying both said first rectifying junction and said recessed portion, an emitter connection to said first surface region, a collector connection to said second surface region, and means enabling the actuating radiation for the phototransistor to impinge on the said recessed wafer portion and thereby irradiate the interior regions of said wafer close to the second rectifying connection, producing a shorter response time for the phototransistor.

2. A radiation actuable phototransistor comprising a thin wafer of semiconductive material of one type conductivity having opposed major surfaces, a fused emitter electrode on one major surface forming a first region of the opposite type conductivity and a first rectifying junction with an interior region of said wafer of said one type conductivity, said first junction extending substantially parallel to the one major surface and having a given cross-sectional area in a plane parallel to said one major surface, a fused collector electrode on the opposite maojr surface forming a second region of the opposite type conductivity and a second rectifying junction with an interior region of said wafer, said semiconductive wafer having adjacent the first rectifying junction a recessed portion extending from the said one major surface past the first rectifying junction and into the wafer interior of said one type conductivity close to but spaced from the second rectifying junction, said spacing to the second rectifying junction being less than one-half the closest spacing between the first and second rectifying junctions, the second rectifying junction extending substantially parallel to said first rectifying junction and having a cross-sectional area in a plane parallel to said one major surface that is substantially greater than said given cross-sectional area, said second rectifying junction underlying both said first rectifying junction and said recessed portion, and emitter connection to said emitter electrode, a collector connection to said collector electrode, and means enabling the actuating radiation for the phototransistor to impinge on the said recessed wafer portion and thereby irradiate the interior regions of said wafer close to the second rectifying connection, producing a shorter response time for the phototransistor.

3. A phototransistor as set forth in claim 1, wherein the recessed portion is spaced from the second rectifying junction a distance equal approximately to an absorption length.

4. A phototransistor as set forth in claim 2, wherein the emitter is annular and opposed to the collector, and the recessed wafer portion extends within and is surrounded by the annular emitter.

References Cited by the Examiner

UNITED STATES PATENTS

| | | | |
|---|---|---|---|
| 2,629,802 | 2/53 | Pantchechnidoff | 136—89 |
| 2,705,767 | 4/55 | Hall | 136—89 |
| 2,794,846 | 6/57 | Fuller | 136—89 |
| 2,846,346 | 8/58 | Bradley | 136—89 |
| 3,004,168 | 10/61 | Emeis | 317—235 X |

DAVID J. GALVIN, *Primary Examiner.*

JOHN H. MACK, JAMES D. KALLAM, *Examiners.*